US009294166B2

(12) United States Patent
Tsutsui et al.

(10) Patent No.: US 9,294,166 B2
(45) Date of Patent: *Mar. 22, 2016

(54) WIRELESS TRANSMISSION METHOD, AND WIRELESS TRANSMITTER AND WIRELESS RECEIVER (71) Applicant: FUJITSU LIMITED, Kawasaki-shi, Kanagawa (JP)

(72) Inventors: Masafumi Tsutsui, Kawasaki (JP); Hiroyuki Seki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/291,405

(22) Filed: May 30, 2014

(65) Prior Publication Data
US 2014/0269967 A1 Sep. 18, 2014

Related U.S. Application Data (63) Continuation of application No. 12/177,499, filed on Jul. 22, 2008, now Pat. No. 8,995,916, which is a continuation of application No. PCT/JP2006/301776, filed on Feb. 2, 2006.

(51) Int. Cl.
H04B 7/00 (2006.01)
H04B 7/04 (2006.01)
H04B 7/06 (2006.01)
H04B 7/08 (2006.01)

(52) U.S. Cl.
CPC ............ H04B 7/0413 (2013.01); H04B 7/0417 (2013.01); H04B 7/0632 (2013.01); H04B 7/088 (2013.01)

(58) Field of Classification Search
CPC ......................................................... H04B 7/00
USPC ................ 455/59, 60, 61, 63.4, 69, 575.7
See application file for complete search history.

(56) References Cited

U.S. PATENT DOCUMENTS 7,688,789 B2    3/2010  Pan et al.
8,121,079 B2    2/2012  Geng et al.
2003/0013468 A1  1/2003  Khatri (Continued)

FOREIGN PATENT DOCUMENTS

CN    1520644 A      8/2004
JP    2004328464 A   11/2004

(Continued)

OTHER PUBLICATIONS

Non-Final Office Action issued by the United States Patent and Trademark Office for corresponding U.S. Appl. No. 13/765,462, dated Aug. 30, 2013.

(Continued)

Primary Examiner — Wen Huang
(74) Attorney, Agent, or Firm — Myers Wolin, LLC (57) ABSTRACT A wireless transmission method capable of transmitting a data stream by a wireless transmitter having a plurality of transmitting antennas, the wireless transmission method includes at the wireless transmitter, changing the number of candidates of selectable transmission beams to be formed for transmitting the data stream according to the number of transmission data streams, said transmission beams are formed by predetermined number of the plurality of transmitting antennas.

8 Claims, 8 Drawing Sheets (56) References Cited

U.S. PATENT DOCUMENTS

| | | |
|---|---|---|
| 2003/0224828 A1 | 12/2003 | Ylitalo et al. |
| 2004/0121810 A1 | 6/2004 | Goransson et al. |
| 2004/0204108 A1 | 10/2004 | Etkin et al. |
| 2004/0213187 A1 | 10/2004 | Fujil |
| 2005/0213682 A1 | 9/2005 | Han et al. |
| 2006/0039328 A1 | 2/2006 | Ihm et al. |
| 2006/0093065 A1 | 5/2006 | Thomas et al. |
| 2006/0121946 A1 | 6/2006 | Walton et al. |
| 2006/0133530 A1 | 6/2006 | Kwak et al. |
| 2006/0210070 A1 | 9/2006 | Reznik et al. |
| 2008/0008110 A1 | 1/2008 | Kishigami et al. |
| 2008/0069058 A1 | 3/2008 | Geng et al. |
| 2008/0108310 A1 | 5/2008 | Tong et al. |
| 2008/0279125 A1 | 11/2008 | Hottinen |

FOREIGN PATENT DOCUMENTS

| | | |
|---|---|---|
| JP | 2005311902 A | 11/2005 |
| JP | 2006005908 A | 1/2006 |
| WO | 03003604 A1 | 1/2003 |
| WO | 2005125044 A1 | 12/2005 |
| WO | 2006006770 A1 | 1/2006 |

OTHER PUBLICATIONS

Non-Final Office Action issued by the United States Patent and Trademark Office for corresponding U.S. Appl. No. 13/765,476, dated Aug. 30, 2013.
Non-Final Office Action issued by the United States Patent and Trademark Office for corresponding U.S. Appl. No. 12/177,499, dated Aug. 8, 2011.
Non-Final Office Action issued by the United States Patent and Trademark Office for corresponding U.S. Appl. No. 12/177,499, dated Oct. 24, 2012.
Non-Final Office Action issued by the United States Patent and Trademark Office for corresponding U.S. Appl. No. 12/177,499, dated Sep. 5, 2013.
Non-Final Office Action issued by the United States Patent and Trademark Office for corresponding U.S. Appl. No. 12/177,499, dated Mar. 27, 2014.
Final Office Action issued by the United States Patent and Trademark Office for corresponding U.S. Appl. No. 13/765,462, dated Mar. 20, 2014.
Final Office Action issued by the United States Patent and Trademark Office for corresponding U.S. Appl. No. 13/765,476, dated Mar. 20, 2014.
Final Office Action issued by the United States Patent and Trademark Office for corresponding U.S. Appl. No. 12/177,499, dated Dec. 20, 2011.
Final Office Action issued by the United States Patent and Trademark Office for corresponding U.S. Appl. No. 12/177,499, dated Apr. 18, 2013.
International search report issued for corresponding international patent application No. PCT/JP2006/301776, mailed May 16, 2006.
Extended European search report issued for corresponding European patent application No. 06712919.7, dated Dec. 19, 2011.
Examiner's first report on Australian patent application No. 2010214706, dated Mar. 9, 2012.
Third Notification of Office Action issued for corresponding Chinese patent application No. 200680052201.X, issued Sep. 29, 2012, with English translation.
Office Action issued by the Russian Patent Office for corresponding patent application No. 200813154, dated Jul. 13, 2009, with English translation.
Fujitsu; "Multi-Beam MIMO for EUTRA Downlink"; 3GPP TSG RAN WG1 meeting #43; R1-051438; Nov. 7-11, 2005.
Fujitsu; "Performance of Multi-Beam MIMO for EUTRA Downlink"; 3GPP TSG RAN WG1 meeting #44; R1-060561; Feb. 13-17, 2006.
First Notification of Office Action issued for corresponding Chinese Patent Application No. 201310075534.6 dated Feb. 2, 2015 with a full English translation.
Office Action issued for corresponding Canadian Patent Application No. 2,640,577 dated Apr. 7, 2015.
Office Action issued for corresponding European Patent Application No. 06 712 919.7 dated Jun. 15, 2015.

WIRELESS TRANSMISSION METHOD, AND WIRELESS TRANSMITTER AND WIRELESS RECEIVER

The present application is a continuation of U.S. application Ser. No. 12/177,499, filed Jul. 22, 2008, now pending, which is a continuation of International Application No. PCT/JP2006/301776 filed Feb. 2, 2006, the contents of each are wholly incorporated herein by reference. This application also relates to U.S. application Ser. No. 13/765,462 and U.S. application Ser. No. 13/765,476.

TECHNICAL FIELD

The present invention relates to a wireless transmission method, and a wireless transmitter and a wireless receiver, and for example, relates to a technique for use in a multiple-input and multiple-output wireless transmission technique for performing signal transmission by using a plurality of transmitting and receiving antennas in a wireless communication system such as a mobile-phone and a wireless access.

BACKGROUND ART

Recently, a MIMO (Multiple-Input Multiple-Output) has drawn attention as the technique for enabling a high-capacity (high-speed) data communication by effectively using a frequency band. The MIMO is the technique to transmit separate data streams from a plurality of antennas of a transmitter by using a plurality of antennas in both of the transmission and the reception, that is to say, by using the transmitter having a plurality of antennas and the receiver having a plurality of antennas, and individually separate a plurality of transmission signals (data streams) mixed on a transmission path from the signal received by each receiving antenna of the receiver by using a transmission path (channel) estimate value, thereby improving a transmission rate without requiring an enlargement of the frequency band.

Figure 8:
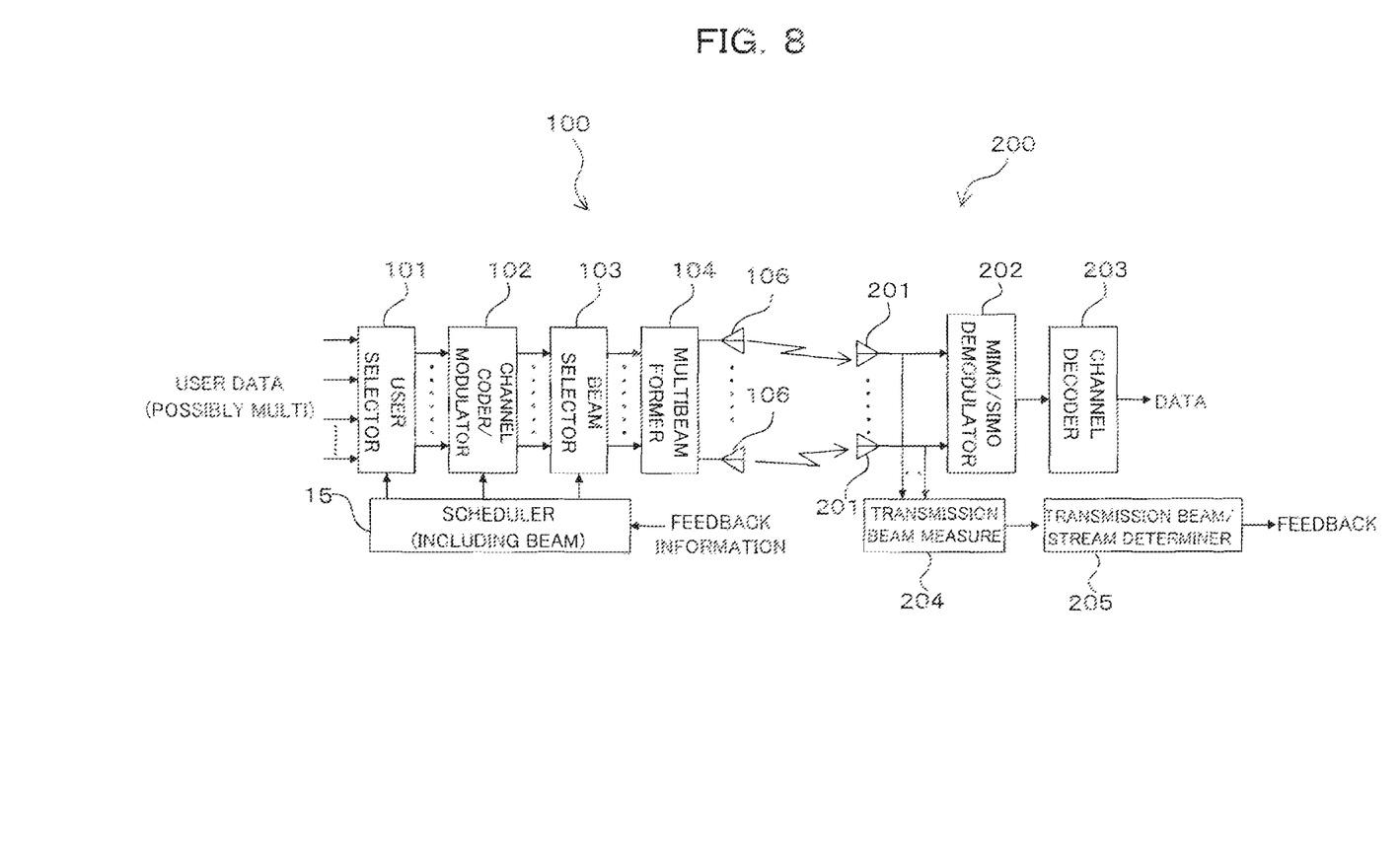
FIG. 8 is a block diagram illustrating a configuration of the previous MIMO transmission system.

FIG. 8 illustrates a configuration example of the previous MIMO transmission system. The system illustrated in FIG. 8 corresponds to a system shown in FIG. 1 of the Non-Patent Document 1 to be described later, and is provided with a MIMO transmitter 100 and a MIMO receiver 200; focusing on substantial parts thereof, the MIMO transmitter 100 is provided with a user selector 101, a channel coder/modulator 102, a beam selector 103, a multibeam former 104, a scheduler 105 and a plurality of transmitting antennas 106, and the MIMO receiver 200 is provided with a plurality of receiving antennas 201, a MIMO/SIMO demodulator 202, a channel decoder 203, a transmission beam measure 204 and a transmission beam/stream determiner 205.

Also, in the MIMO transmitter 100, in the user selector 101, under the control of the scheduler 105, one or more user data stream to be transferred is selected from a plurality of series of user data streams and is input to the channel coder/modulator 102, and in the channel coder/modulator 102, under the control of the scheduler 105, a required error correction coding such as a turbo coding is performed with a specified coding ratio, and after that, obtained bit series is mapped to a specified modulation scheme, for example, a symbol having a signal point (signal of the data channel) such as QPSK (Quadrature Phase Shift Keying) and 16QAM (Quadrature Amplitude Modulation) and is modulated. Meanwhile, in the channel coder/modulator 102, in addition to the data channel signal, the signal of the pilot channel (pilot symbol) used for channel estimation and the signal of the control channel (control symbol) transmitting the control information may be multiplexed.

The modulated data thus-obtained is input to the beam selector 103, and in the beam selector 103, under the control of the scheduler 105, the beam used for transmitting the modulated data is selected from a plurality of fixed beams (multibeam) formed by the multibeam former 104 by just the number of streams to be transmitted and the modulated data is transmitted from the transmitting antenna 106 by the selected beam.

For example, assuming that the number of transmitting antennas 106 is four and the number of fixed beams capable of being formed by the multibeam former 104 is four at the maximum, when the number of streams to be transmitted is four, all of the four beams are selected, and in a case of two streams, two beams are selected out of four beams, and in a case of one stream, one stream is selected out of four beams.

On the other hand, in the MIMO receiver 200, a wireless signal transmitted from the transmitting antenna 106 of the MIMO transmitter 100 is received by each receiving antenna 201, and MIMO demodulated or SIMO (Single-Input Multi-Output) demodulated by the MIMO/SIMO demodulator 202, and the user data stream is generated. That is to say, in the MIMO/SIMO demodulator 202, the user data streams multiplexed for each of the transmitting antennas 106 are separated by a method of using an inversion matrix of a channel correlation matrix and a method of using an MLD (Maximum Likelihood Detection) algorithm, based on a channel estimate value (channel matrix) obtained by a correlation calculation of the received pilot symbol and the pilot replica, and the demodulated data is generated.

The obtained demodulated data is input to the channel decoder 203, and an error correction decoding such as a turbo decoding is performed in the channel decoder 203, and decoded data of the user stream received by the data channel may be obtained.

Meanwhile, each signal received at the receiving antenna 201 is also input to the transmission beam measure 204, and a CQI (Channel Quality Indicator) value, which is an index of reception quality, is measured based on the received pilot symbol in the transmission beam measure 204, and one or more beam of which reception quality is the best is determined (selected) based on the obtained CQI value in the transmission beam/stream determiner 205. Then, information including the determined number of beams, corresponding CQI value and the beam ID is generated as feedback information to the MIMO transmitter 100 and is transmitted to the MIMO transmitter 100.

The above-described feedback information is finally reported to the scheduler 105 of the MIMO transmitter 100, and thereby, the scheduler 105 controls the user selector 101, the channel coder/modulator 102 and the beam selector 103 so as to transmit the transmission user data stream as described above by the beam of the number of beams (beam ID) determined (selected) in the MIMO receiver 200 (transmission beam/stream determiner 205) and by the coding ratio and modulation scheme depending on the reported CQI value.

Meanwhile, as disclosed in the Patent Document 1 to be described later, in the closed loop type MIMO transmission scheme, which performs pre-coding on the transmitting side, it is also required to send back the information of the channel matrix or the received weight (weighting coefficient of the multibeam) obtained on the receiving side, as the feedback information to the transmitting side.

Patent Document 1: Japanese Patent Application Laid-Open No. 2005-311902

Non-Patent Document 1: 3GPP TSG RAN WGI meeting #43 (R1-051438), "Multi-beam MIMO for EUTRA Downlink", Fujitsu, November 2005

SUMMARY OF THE INVENTION

Problem to be Solved by the Invention

For improving the transmission rate by the MIMO multiplex method, (1) a high SNR (Signal to Noise Ratio) and (2) a low interantenna correlation (or a low interbeam correlation) are required. In a case in which the condition is not satisfied, throughput characteristics by the MIMO multiplex are significantly deteriorated, so that it is advantageous to use the MIMO diversity or directional beam transmission for the sake of the throughput of the entire system.

Herein, in the above-described previous technique, since the number of beams to be formed is constant irrespective of the number of transmission streams (for example, fixed to the maximum value of the number of beams capable of being formed) [in other words, a beam divergence (directional intensity) for one beam is constant], the effect by the MIMO multiplex is not obtained depending on the beam to be selected, so that the throughput characteristics may be deteriorated.

For example, if the beams having a high correlation therebetween (for example, adjacent beams) are selected on the transmitting side by the feedback information from the receiving side, the separation and the demodulation processing capability of the user data streams on the receiving side are deteriorated. Therefore, if the beams having a low correlation therebetween are selected, deterioration in such a separation and demodulation processing capability may be suppressed; however, this is more deteriorated than the reception quality by the beam, which is supposed to be selected as the one of which reception quality (directional gain) is excellent for the receiving side due to the directionality of the beam.

Herein, as disclosed in the Patent Document 1, although it is possible to adjust the selected interbeam correlation and the beam directionality to ease the deterioration in the separation and the demodulation processing capability and the deterioration in the reception quality by feed backing the channel matrix and the reception weight used on the receiving side as the feedback information to the transmitting side, the feedback information amount is increased and the arithmetic processing for adjustment is required.

The present invention is made in view of such a problem, and an object thereof is to combine the high throughput characteristics by the low interbeam correlation and the high directional gain to obtain the excellent reception characteristic without increasing the feedback information amount in the MIMO transmission.

Means for Solving the Problem

In order to achieve the above-described object, the present invention uses a wireless transmission method, and a wireless transmitter and a wireless receiver to be described below. That is to say, (1) As a generic aspect, there provided is the wireless transmission method capable of transmitting a data stream between a wireless transmitter having a plurality of transmitting antennas and a wireless receiver having a plurality of receiving antennas by a multibeam, the method including: controlling the number of transmission beams to be formed for transmitting the data stream depending on the number of data streams to be transmitted at the wireless transmitter, and selectively receiving any one or more transmission beam from the transmission beams by the wireless receiver.

(2) Herein, the wireless transmitter may control to increase the number of transmission beams in proportion as the number of transmission data streams is smaller.

(3) Also, the wireless receiver may selectively receive two or more of the transmission beams having a low correlation therebetween, when the number of transmission data streams is two or larger.

(4) Further, the wireless receiver may selectively receive nonadjacent transmission beams as the transmission beams having a low correlation therebetween.

(5) In addition, the wireless transmitter may multiplex a pilot signal for each of the transmitting antennas to perform beam transmission by a fixed weighting coefficient, and the wireless receiver may measure a level of the transmission beam based on the pilot signal and the weighting coefficient, determine the number of transmission data streams and the transmission beam to be received based on the measured level, and report information regarding the number of transmission data streams and the transmission beam, which are determined, to the wireless transmitter, and the wireless transmitter may control the number of transmission beams based on the information reported from the wireless receiver.

(6) Further, the wireless transmitter may multiplex a pilot signal for each of the transmission beams to perform beam transmission by a fixed weighting coefficient, and the wireless receiver may measure a level of the transmission beam based on the pilot signal, determine the number of transmission data streams and the transmission beam to be received based on the measured level, and report information regarding the number of transmission data streams and the transmission beam, which are determined, to the wireless transmitter, and the wireless transmitter may control the number of transmission beams based on the information reported from the wireless receiver.

(7) Alternatively, the wireless transmitter may multiplex a pilot signal for each of the transmitting antennas to perform beam transmission by a variable weighting coefficient, and broadcast information regarding the weighting coefficient and information regarding the number of transmission beams to the wireless receiver, and the wireless receiver may measure a level of the transmission beam based on the pilot signal and the information regarding the weighting coefficient broadcasted from the wireless transmitter, determine the number of transmission data streams and the transmission beam to be received based on the measured level and the information regarding the number of transmission beams broadcasted from the wireless transmitter, and report information regarding the number of transmission data streams and the transmission beam, which are determined, to the wireless transmitter, and the wireless transmitter may control the number of transmission beams based on the information reported from the wireless receiver.

(8) As another generic aspect, there provided is a wireless transmitter which is capable of transmitting a data stream to a wireless receiver having a plurality of receiving antennas by a multibeam, and is provided with a plurality of transmitting antennas, and number-of-transmission beams control means operable to control the number of transmission beams to be formed for transmitting the data stream depending on the number of data streams to be transmitted from the transmitting antennas.

(9) Herein, the number-of-transmission beams control means may control to increase the number of transmission beams in proportion as the number of transmission data streams is smaller.

(10) Also, this transmitter may be further provided with first pilot multiplex means operable to multiplex a pilot signal for each of the transmitting antennas; a first beam former operable to perform beam transmission by a fixed weighting coefficient, and first reported information receiving means to receive information regarding the number of transmission data streams and the transmission beam, determined based on a level measurement result measured for the transmission beam based on the pilot signal and the weighting coefficient in the wireless receiver and reported from the wireless receiver, wherein the number-of-transmission beams control means may control the number of transmission beams based on the information received by the first reported information receiving means.

(11) Further, this transmitter may be further provided with second pilot multiplex means operable to multiplex a pilot signal for each of the transmission beams, a first beam former operable to perform beam transmission by a fixed weighting coefficient, and second reported information receiving means to receive information regarding the number of transmission data streams and the transmission beam, determined based on a level measurement result measured for the transmission beam based on the pilot signal in the wireless receiver and reported from the wireless receiver, wherein the number-of-transmission beams control means may control the number of transmission beams based on the information received by the second reported information receiving means.

(12) Also, this transmitter may be further provided with first pilot multiplex means operable to multiplex a pilot signal for each of the transmitting antennas, a second beam former operable to perform beam transmission by a variable weighting coefficient, broadcasting means operable to broadcast information regarding the weighting coefficient and information regarding the number of transmission beams to the wireless receiver, and third reported information receiving means to receive information regarding the number of transmission data streams and transmission beam, determined based on a level measurement result measured for the transmission beam based on the pilot signal and the information regarding the weighting coefficient broadcasted by the broadcasting means and the information regarding the number of transmission beams broadcasted by the broadcasting means, and reported from the wireless receiver, wherein the number-of-transmission beams control means may control the number of transmission beams based on the information received by the third reported information receiving means.

(13) As still another generic aspect, there provided is a wireless receiver which is capable of receiving a data stream from a wireless transmitter having a plurality of transmitting antennas by a multibeam, and is provided with a plurality of receiving antennas, and beam selective reception control means operable to selectively receive any one or more transmission beam through the receiving antennas from the transmission beams of which number of transmission beams to be formed for transmitting the data stream is controlled depending on the number of data streams to be transmitted by the wireless transmitter.

(14) Herein, the beam selective reception control means may selectively receive two or more of the transmission beams having a low correlation therebetween, when the number of transmission data streams is two or larger.

(15) Also, the beam selective reception control means may selectively receive nonadjacent transmission beams as the transmission beams having a low correlation therebetween.

(16) Further, the wireless transmitter may multiplex a pilot signal for each of the transmitting antennas to perform beam transmission by a fixed weighting coefficient, and the beam selective reception control means may be provided with a first level measuring section to measure a level of the transmission beam based on the pilot signal and the weighting coefficient, a first determining section operable to determine the number of transmitting data streams and the transmission beam to be received based on the level measured by the first level measuring section, and a first report section to report information regarding the number of transmission data streams and the transmission beam determined by the first determining section as control information of the number of transmission beams in the wireless transmitter.

(17) In addition, the wireless transmitter may multiplex a pilot signal for each of the transmitting beams to perform beam transmission by a fixed weighting coefficient, and the beam selective reception control means may be provided with a second level measuring section to measure a level of the transmission beam based on the pilot signal, a second determining section operable to determine the number of transmission data streams and the transmission beam to be received based on the level measured by the second level measuring section, and a second report section to report information regarding the number of transmission data streams and the transmission beam determined by the second determining section as control information of the number of transmission beams in the wireless transmitter.

(18) Further, the wireless transmitter may multiplex a pilot signal for each of the transmitting antennas to perform beam transmission by a variable weighting coefficient, and broadcast the information regarding the weighting coefficient and the information regarding the number of transmission beam to the wireless receiver, and the beam selective reception control means may be provided with a third level measuring section to measure a level of the transmission beam based on the pilot signal and the information regarding the weighting coefficient broadcasted from the wireless transmitter, a third determining section operable to determine the number of transmission data streams and the transmission beam to be received based on the level measured by the third level measuring section and the information regarding the number of transmission beams broadcasted from the wireless transmitter, and a third report section to report information regarding the number of transmission data streams and the transmission beam determined by the third determining section as control information of the number of transmission beams in the wireless transmitter.

Effect of the Invention

According to the above-described aspects, at least any of following effect or advantage may be obtained.

(1) In the transmitter, the number of transmission beams (the number of selectable beams of a transmission source) to be formed depending on the number of data streams to be transmitted is controlled (changed), so that it becomes possible to obtain good throughput characteristics (reception characteristics) without increasing the feedback information amount from the receiver to the transmitter.

(2) For example, by increasing the number of transmission beams in proportion as the number of transmission data streams is smaller, the number of selectable transmission source beams increases, so that it becomes possible to obtain the high directional gain.

(3) Also, in a case in which the number of transmission data streams is two or larger, by selectively receiving two or more transmission beams having a low correlation therebetween (for example, nonadjacent), it becomes possible to avoid deterioration of data stream separation capability on the receiving side and obtain high throughput characteristics due to the low interbeam correlation.

EXPLANATIONS OF REFERENCE NUMERALS

1 MIMO transmitter
11 user selector
12 channel coder/modulator
13 beam selector
14 multibeam former
15 scheduler (beam controller) (number-of-transmission beam control means, first, second, third reported information receiving means)
16-1 to 16-$n$ transmitting antennas
17 element pilot multiplexer (first pilot multiplex means)
17-1 to 17-$n$ adders (multiplex circuit)
17$a$ beam pilot multiplexer (second pilot multiplex means)
17$a$-1 to 17$a$-$n$ adders (multiplex circuits)
18 broadcast information adder (broadcasting means)
19$a$ weight generator
19$b$ selectable beam information generator
2 MIMO receiver
20 beam selective reception control means
21-1 to 21-M receiving antennas
22 MIMO/SIMO demodulator
23 decoder (channel decoder)
24 transmission beam measure (first, second, third level measuring section)
25 known pilot memory
26 known transmission weight memory
27 transmission beam ID/stream determiner (first, second, third determining section, first, second, third report section)
271 ranking level comparator
28 known selectable beam memory
281 comparative beam ID table
281 broadcast information extractor
30-0 to 30-9 beams

BEST MODE(S) FOR CARRYING OUT THE INVENTION

Hereinafter, an embodiment of the present invention is described with reference to the drawings.

[A] Overview

Figure 1:
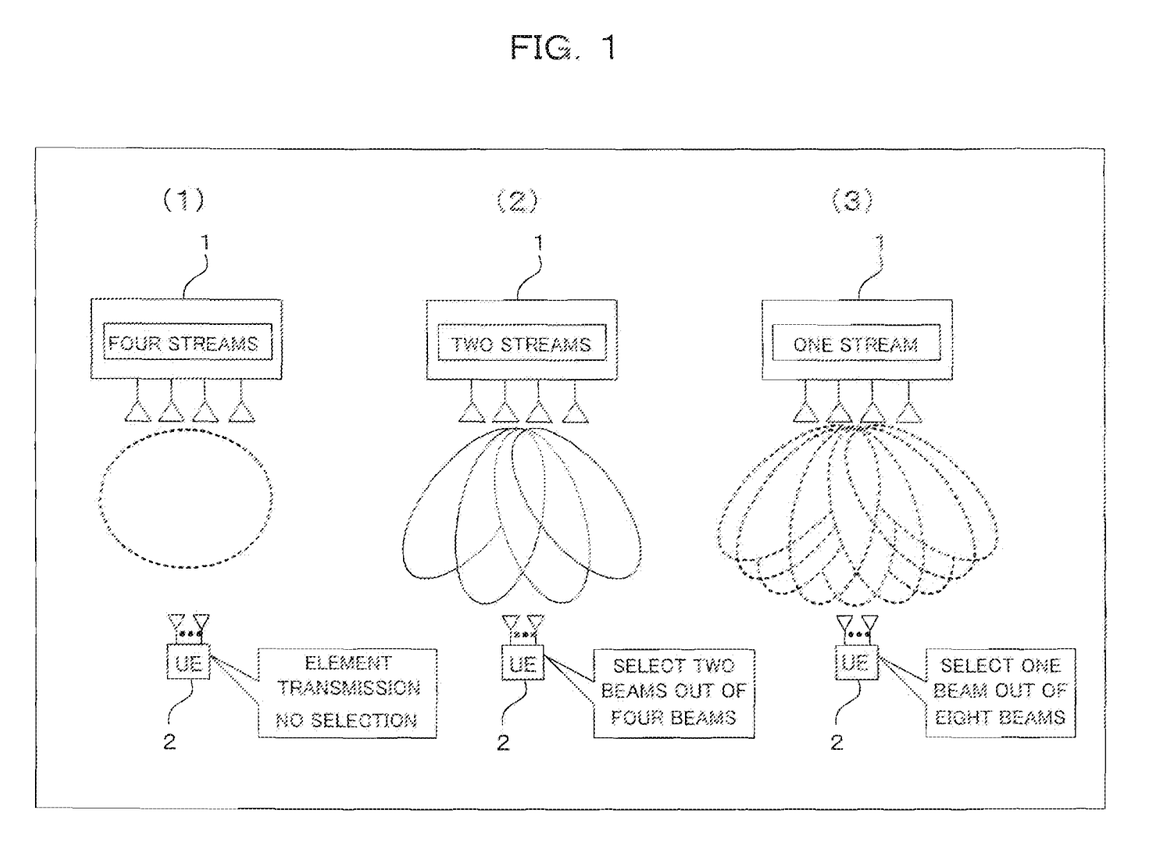
FIG. 1 is a view for illustrating an overview of an embodiment.

First, an overview of the embodiment to be described below is described by using FIG. 1. In FIG. 1, reference numerals 1 and 2 represent a MIMO transmitter provided with a plurality of (herein, four) transmitting antennas and a MIMO receiver provided with a plurality of receiving antennas, respectively, and it is configured such that wireless MIMO transmission is performed between the MIMO transmitter 1 and the MIMO receiver 2. The MIMO transmitter 1 is applicable, for example, as a base station device of a mobile wireless communication system, and the MIMO receiver 2 is applicable as a mobile station device (UE: User Equipment) of the system. Therefore, in a following description, the MIMO transmitter 1 is also represented as a base station device 1 or a base station 1, and the MIMO receiver 2 is also represented as a mobile station device 2 or a mobile station 2. In addition, a detailed specification conforms to a Table A1 in the Non-Patent Document 1, for example.

Also, in this example, the base station device 1 is configured to be able to change (control) the number of beams to be formed (beamforming) depending on the number of user data streams to be sent (transmitted) (hereinafter, also simply referred to as "transmission stream"), and the mobile station device 2 is configured to be able to selectively receive any one or more beam from a multibeam having the above-described number of beams.

For example, in the base station 1, when the number of transmission streams is not large, or in the case of a single stream at the minimum, the mobile station 2 selectively receives, for example, the beam of which reception level is the maximum out of more beams formed by the base station 1. Also, as the number of transmission streams increases, a combination of selectable beams is limited. When the number of transmission streams is large, in a case of transmitting the multistream of up to the number of transmitting antennas, the beam by element transmission (also construable that there is only one selectable number of beams) is selectively received.

Meanwhile, in FIG. 1, cases in which (1) the number of transmission streams is four, (2) the number thereof is two and (3) the number thereof is one in the base station 1 are shown, respectively, and it is illustrated that in the case of (1), the base station 1 forms one beam by each of the transmitting antennas and element transmits four streams by the beam, and the mobile station 2 directly (without selecting the beam) receives the signal, which is element transmitted by one beam, in the case of (2), the base station 1 forms four beams and transmits two streams by the four beams, and the mobile station 2 selectively receives, for example, two beams having low interbeam correlation therebetween out of the four beams, and in the case of (3), the base station 1 forms eight beams and transmits one stream by the eight beams, and the mobile station 2 selectively receives one beam out of the eight beams, respectively.

In this manner, it becomes possible to obtain excellent throughput characteristics and a directional gain, by making it possible to obtain the gain as large as possible at the time of one stream and by selecting the beams such that the interbeam correlation is low at the time of multistream, by changing the original number of beams selectable depending on the number of transmission streams, that is to say, the number of transmission beams to be formed (beamforming).

Hereinafter, a specific example is described in detail.

[B] Description of First Embodiment

Figure 2:
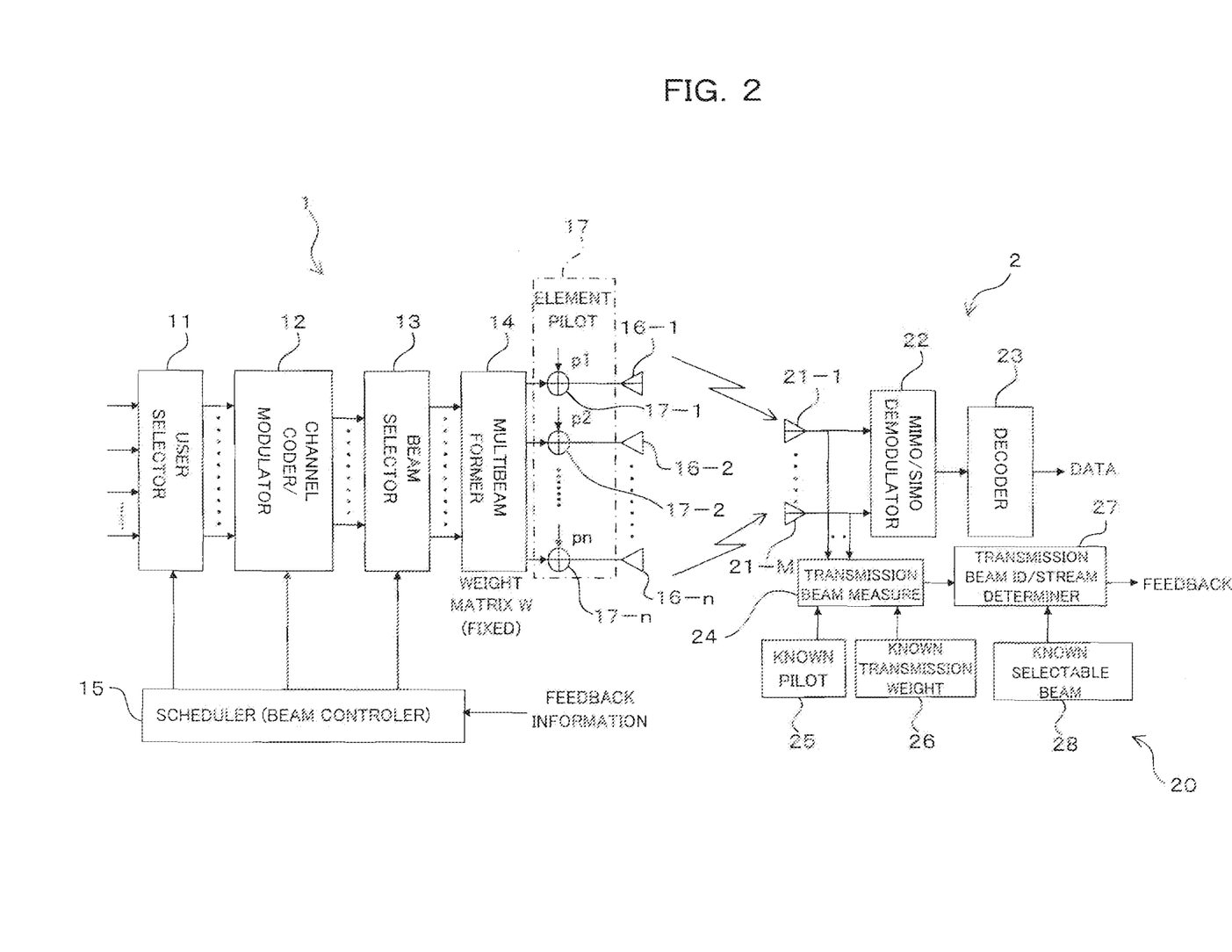
FIG. 2 is a block diagram illustrating a configuration of a MIMO transmission system according to a first embodiment.

FIG. 2 is a block diagram illustrating a configuration of the MIMO transmission system according to a first embodiment, and the MIMO transmission system shown in FIG. 2 is provided with the MIMO transmitter 1 and the MIMO receiver 2; focusing on substantial parts thereof, the MIMO transmitter 1 is provided with a user selector 11, a channel coder/modulator 12, a beam selector 13, a multibeam former 14, a scheduler (beam controller) 15, a plurality of transmitting antennas 16-1 to 16-n (n is an integer of 2 or larger) and an element pilot multiplexer 17, and the MIMO receiver 2 is provided with one or a plurality of receiving antennas 21-1 to 21-M (M is an integer of 1 or larger and possibly M=n), a MIMO/SIMO demodulator 22, a decoder (channel decoder) 23, a transmission beam measure 24, a known pilot memory 25, a known transmission weight memory 26, a transmission beam ID/stream determiner 27 and a known selectable beam memory 28. In what follows, the MIMO transmitter 1 may be referred to simply as "transmitter 1" or "transmitting side 1" and the MIMO receiver 2 may be referred to simply as "receiver 2" or "receiving side 2".

Here, in the MIMO transmitter 1, the user selector 11 is operable to select one or more user data stream to be transmitted from a plurality of series of user data streams under the control of the scheduler 15, and the channel coder/modulator 12 is operable to perform a required error correction coding such as a turbo coding with a specified coding ratio under the control of the scheduler 15, and mapping obtained bit series to a specified modulation scheme, for example, a symbol having a signal point (signal of data channel) such as QPSK (Quadrature Phase Shift Keying) or 16QAM (Quadrature Amplitude Modulation), thereby modulating the same.

The beam selector 13 is operable to select one or a plurality of beam used for transmitting the transmission stream (user data) coded and modulated by the channel coder/modulator 12, from a plurality of beams (multibeam) formed by the multibeam former 14, under the control of the scheduler (beam controller) 15, in greater detail, depending on feedback information (information regarding a transmission beam ID and the transmission stream) from the receiving side 2. The transmission beam ID (identification information) is uniquely defined (set) based on a transmission weight matrix W used in the multibeam former 14 to be described below (same as above).

The multibeam former (first beam former) 14 is operable to form the multibeam for transmitting the transmission stream based on a predetermined transmission weight matrix (weighting coefficient) W. In this example, the transmission weight matrix W is fixed.

The element pilot multiplexer (first pilot multiplex means) 17 is operable to multiplex an orthogonal pilot signal (symbol) pi for each of the transmitting antennas 16-i (i=1 to n) by adders (multiplex circuits) 17-1 to 17-n of the transmitting antennas 16-1 to 16-n, respectively, and thereby, the orthogonal pilot signal pi is transmitted for each of the transmitting antennas 16-i (element).

The beam controller (scheduler; number-of-transmission beam control means) 15 is operable to control the number of transmission beams formed for transmitting the transmission stream depending on the number of transmission streams by controlling beam selection in the above-described beam selector 13, and in this example, it is configured to receive the information regarding the beam ID and the number of streams determined (selected) by the transmission beam ID/stream determiner 27 on the receiving side 2 as feedback information to control the number of transmission streams and the beam (the number of transmission beams to be formed) used for transmitting the transmission stream based on the feedback information.

On the other hand, in the receiver 2, the receiving antennas 21-j (j=1 to M) receives the beam transmitted from each of the transmitting antennas 16-i of the transmitter 1, and the MIMO/SIMO demodulator 22 is operable to MIMO-demodulating or SIMO-demodulating the signal received by each of the receiving antennas 21-j, and the demodulated data is generated by separating the user data streams, which are multiplexed for each of the transmitting antennas 16-i, by a method of using an inversion matrix of a channel correlation matrix and a method of using an MLD algorithm, based on a channel estimate value (channel matrix) obtained by a correlation operation of the pilot signal pi and the pilot replica multiplexed on a received signal.

The decoder 23 decodes the user data stream obtained by the above-described MIMO/SIMO demodulator 22 by a decoding scheme corresponding to the coding scheme in the transmitting side 1.

The known pilot memory 25 stores a replica signal (pilot replica) of the pilot signal pi in advance, the known transmission weight memory 26 is for storing information of the transmission weight matrix W on the transmitting side 1 in advance, and the transmission beam measure (first level measuring section) 24 measures a level for each beam from the transmitter 1 based on the pilot replica stored in the known pilot memory 25 and the information of the transmission weight matrix W stored in the known transmission weight memory 26.

Figure 3:
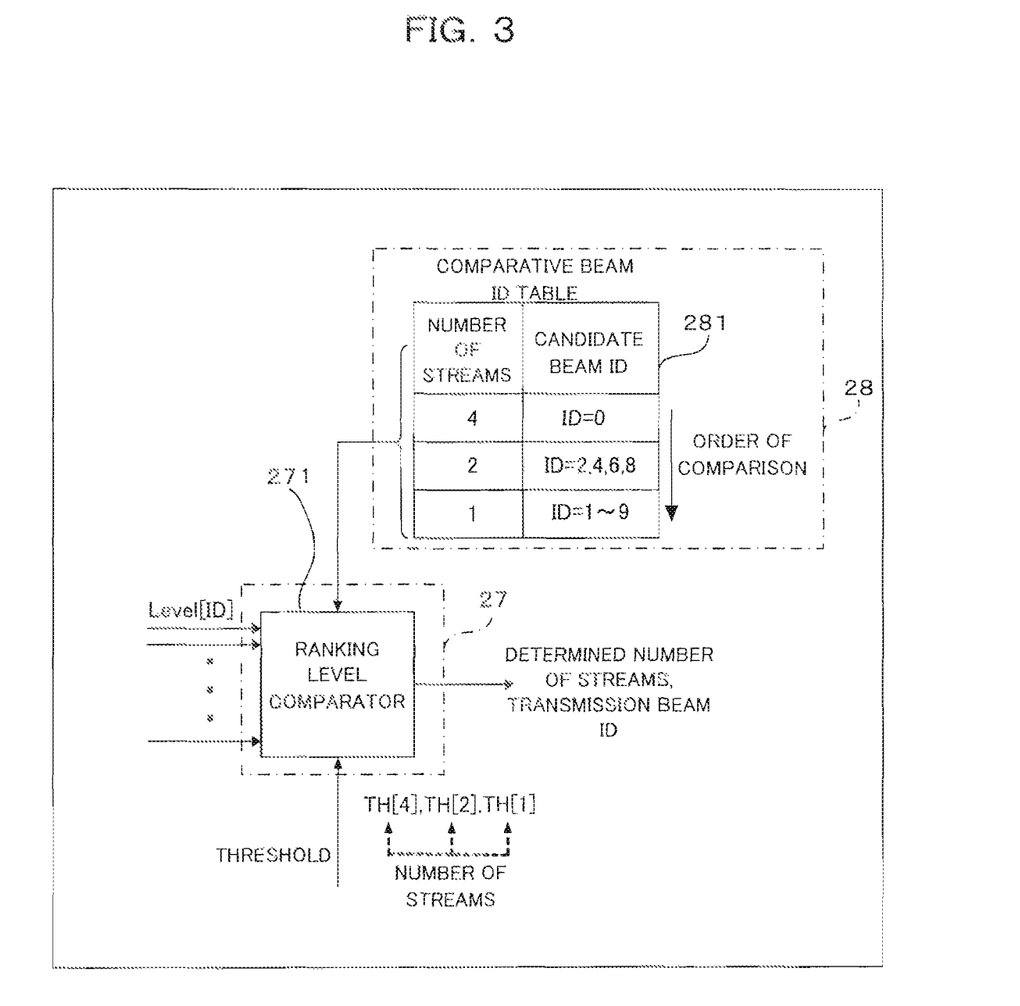
FIG. 3 is a block diagram illustrating a configuration focusing on a transmission beam ID/stream determiner and a known selectable beam memory in FIG. 2.

The known selectable beam memory 28 stores information regarding selectable beam in advance, and in this embodiment, as shown in FIG. 3 for example, a comparative beam ID table 281 in which the number of transmission streams and a candidate beam ID are related to each other is stored. Meanwhile, in the comparative beam ID table 281 shown in FIG. 3, it is illustrated that in a case that the number of transmission streams is four, the candidate of the selectable beam (candidate beam) is one beam, ID=0, in a case that the number of transmission streams is two, the IDs of the candidate beam are 2, 4, 6, 8 (or 1, 3, 5, 7), that is to say, nonadjacent four beams of even number (or odd number) IDs, and in a case that the number of transmission streams is one, the IDs of the candidate beam are 9 beams, 1 to 9.

The transmission beam ID/stream determiner (first determining section) 27 determines information regarding the transmission beam ID (the number of transmission beams) and the number of transmission streams (beam selection information) to be transmitted to the transmitter 1 as the feedback information, based on a measurement result by the transmission beam measure 24 and the information (comparative beam ID table 281) stored in the known selectable beam memory 28, and in this example, as shown in FIG. 3 for example, this is provided with a ranking level comparator 271, and by checking possibility in decreasing order of the number of transmission streams based on a measurement level (Level[ID]) of each beam (ID) measured by the transmission beam measure 24, a threshold (TH[k]) corresponding to the number of transmission streams (k) and contents of the comparative beam ID table 281, in the ranking level comparator 271, the number of transmission streams and the beam ID at that time are determined. Meanwhile, in FIG. 3, a case in which the maximum number of transmission streams is four (that is to say, k=1 to 4) is shown.

That is to say, the block 20 including the above-described transmission beam measure 24, the known pilot memory 25, the known transmission weight memory 26, the transmission beam ID/stream determiner 27 and the known selectable beam memory 28 functions as beam selective reception control means for selectively receiving any one or more of the transmission beams through the receiving antennas 21-$j$ from the transmission beams of which number of transmission beams formed for transmitting the transmission stream is controlled depending on the number of transmission streams by the transmitter 1.

Meanwhile, the information determined by the transmission beam ID/stream determiner 27 is fed back (reported) to the transmitter 1 through a transmission system of the receiver 2 not shown, as control information for transmission beam control (the number of beams to be formed) by the beam controller 15 in the transmitter 1. Therefore, the transmitter 1 (beam controller 15) operates according to the above-described control information (feedback information), thereby controlling the beam selector 13 and the multibeam former 14 to increase the number of transmission beams in proportion as the number of transmission streams is smaller, and controlling the beam selector 13 and the multibeam former 14 to perform the element transmission by one beam of beam ID=0 when the number of transmission streams is the maximum value.

Hereinafter, an operation (beam selection method) of the MIMO transmission system of this embodiment configured as above is described in detail.

First, the transmitter 1 uses a constantly uniform fixed weight as the transmission weight (matrix) W of the multibeam, and multiplexes the orthogonal pilot signal pi for each of the transmitting antennas 16-$i$ to transmit. That is to say, in the user selector 11, under the control of the scheduler 15, one or more user data stream to be transmitted is selected from a plurality of series of user data streams and is input to the channel coder/modulator 12, and in the channel coder/modulator 12, under the control of the scheduler 15, the required error correction coding such as the turbo coding is performed with the specified coding ratio, and after that, the obtained bit series is mapped to the symbol having the signal point (signal of the data channel) such as the specified modulating scheme (QPSK or 16QAM) and is modulated.

The obtained modulated data is input to the beam selector 13, and in the beam selector 13, under the control of the scheduler 15, the beam used for transmitting the modulated data is selected by the number depending on the number of streams to be transmitted from a plurality of fixed beams (multibeam) formed by the multibeam former 14, and the modulated data is transmitted from the transmitting antennas 16 by the selected beam. On this occasion, the orthogonal pilot signal pi is multiplexed by each adder 17-$i$ of the element pilot multiplex section 17 and is transmitted from each transmitting antenna 16-$i$.

On the other hand, in the receiver 2, the signal transmitted from the above-described transmitter 1 by the multibeam is received by each receiving antenna 21-$j$ and is input to the MIMO/SIMO demodulator 22 and the transmission beam measure 24, respectively. In the MIMO/SIMO demodulator 22, the received signal from each receiving antenna 21-$j$ is MIMO demodulated or SIMO demodulated to generate the user data stream. That is to say, the user data stream is separated based on the channel estimate value (channel matrix) to generate the demodulated data.

An error correction decoding such as a turbo decoding is performed to the obtained demodulated data by the decoder 23, thereby, decoded data of the user data stream may be obtained.

On the other hand, in the transmission beam measure 24, a level for each beam is measured based on the pilot replica in the known pilot memory 25 and the information of the known transmission weight W in the known transmission weight memory 26 (hereinafter, also referred to as a transmission weight information W).

For example, when the transmission data vector, the transmission weight information (matrix), pilot vector and channel information (matrix) are represented as $X=[x1, \ldots, xn]$, $W=[W1, \ldots, Wm]$ (wherein, m represents the number of transmission beams), $P=[p1, \ldots, pn]$ and $H=[H1, \ldots, Hn]$, respectively, and the received signal on the receiving side 2 is represented as Y, $Y=HP=HWX$ is received on the receiving side 2.

Therefore, in the transmission beam measure 24, by obtaining the channel information H of each element (transmitting antenna 16-$i$) by using the known pilot vector P, and by obtaining HW by using the known transmission weight information W, it becomes possible to obtain the channel information of each transmission beam, so that the level measurement for each beam becomes possible based on the channel information.

Then, the level measurement result (Level [ID]) for each obtained beam (ID) is input to the transmission beam ID/stream determiner 27, and by checking the possibility in the descending order of the number of the transmission streams by the ranking level comparator 271 based on the level measurement result, the threshold (TH[k]) corresponding to the number of transmission streams (k) and the contents of the comparative beam. ID table 281, the number of transmission streams and the beam ID at that time are determined.

Figure 4:
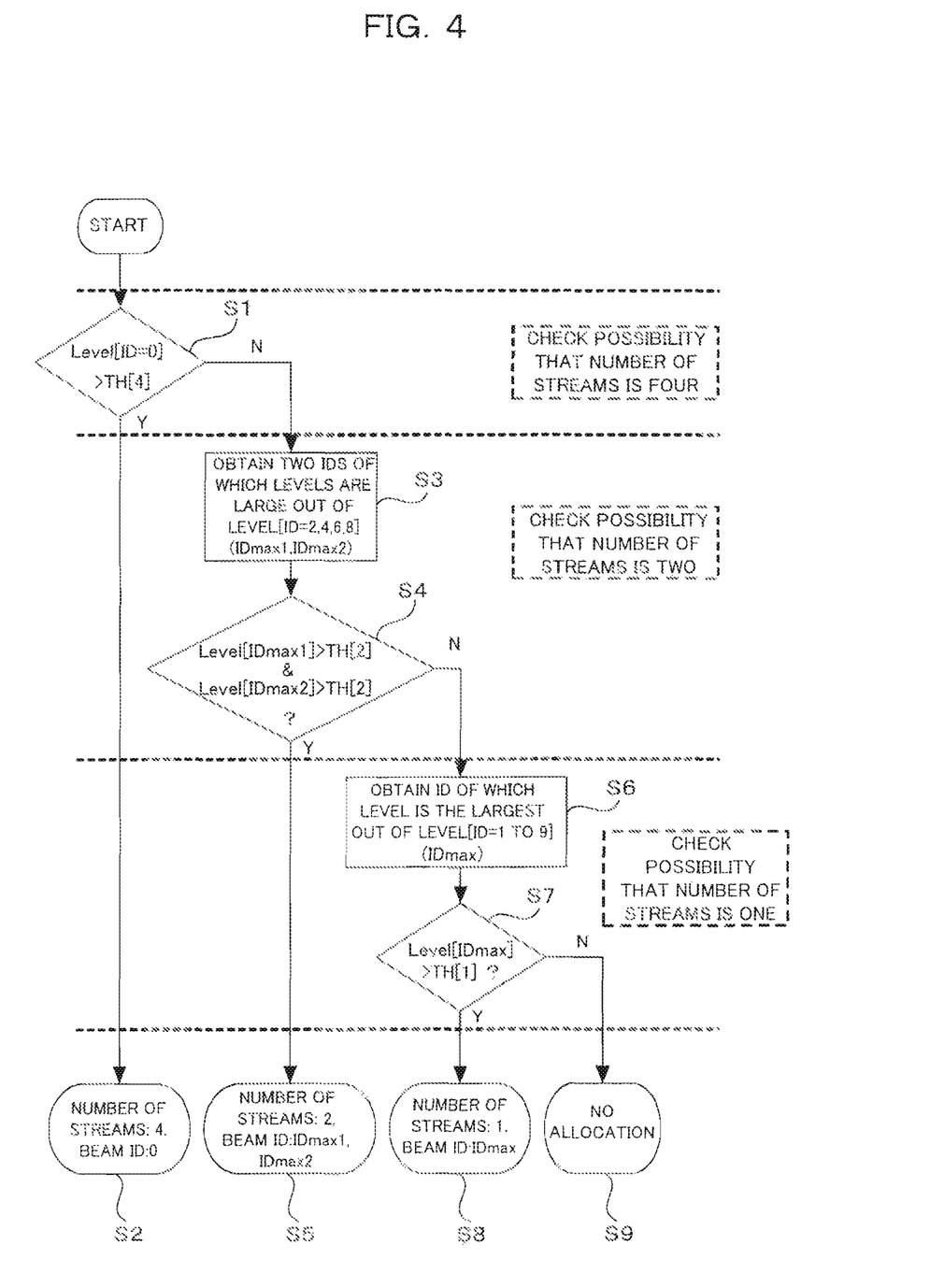
FIG. 4 is a flowchart for illustrating an operation (beam selection method) of the transmission beam ID/stream determiner shown in FIG. 3.

That is to say, as shown in FIG. 4 for example, in a case in which the maximum number of transmission streams is four (beam ID=0), the ranking level comparator 271 first compares the level measurement result Level[ID=0] of the beam ID=0 and the threshold TH[k=4] corresponding to the number of transmission streams k=4 to check whether an equation Level [ID=0]>TH [k=4] is satisfied or not (possibility that the number of transmission streams is four) (step S1). As a result, when the equation Level [ID=0]>TH [k=4] is satisfied, the ranking level comparator 271 determines that the number of transmission streams k=4 and the beam ID=0 (route Y of step 1 to step S2).

On the other hand, when the equation Level[ID=0]≤TH [k=4] is satisfied, the ranking level comparator 271 selects two IDs (IDmax1, IDmax2) of which levels are larger from the level measurement results Level[ID=1], Level[ID=2], Level[ID=3] and Level[ID=4] (route N of step S1 to step S3), and compares each level measurement result Level [ID=IDmax1], Level[ID=IDmax2] and the threshold TH[k=2] corresponding to the number of transmission streams k=2 to check whether both of the level measurement results Level[ID=IDmax1], Level[ID=IDmax2] are larger than the threshold TH[k=2] or not (possibility of that the number of transmission streams is two) (step S4).

As a result, if both of the level measurement results Level [ID=IDmax1], Level [ID=IDmax2] are larger than the threshold TH[k=2], the ranking level comparator 271 determines that the number of transmission streams k=2 and the beam ID=IDmax2, IDmax2 (route Y of step S4 to step S5).

On the other hand, if one or both of the level measurement results Level [ID=IDmax1], Level [ID=IDmax2] is not larger than the threshold TH[k=2], the ranking level comparator 271 selects the maximum ID from the level measurement results Level [ID=1] to Level [ID9] as the IDmax (route N of step S4 to step S6), and checks whether the level measurement result Level [IDmax] is larger than the threshold TH[1] corresponding to the number of transmission streams k=1 or not (possibility of that the number of transmission streams is one) (step S7).

As a result, if the level measurement result Level [IDmax] is larger than the threshold TH[1], the ranking level comparator 271 determines that the number of transmission streams k=1 and the beamID=IDmax (route Y of step S7 to step S8), otherwise, determines that the number of transmission streams and the beam ID are not allocated (route N of step S7 to step S9).

As described above, in the transmission beam ID/stream determiner 27, the beam ID having the maximum channel information reliability is selected from the predetermined known selectable beams depending on the number of streams requesting the transmission.

Figure 5:
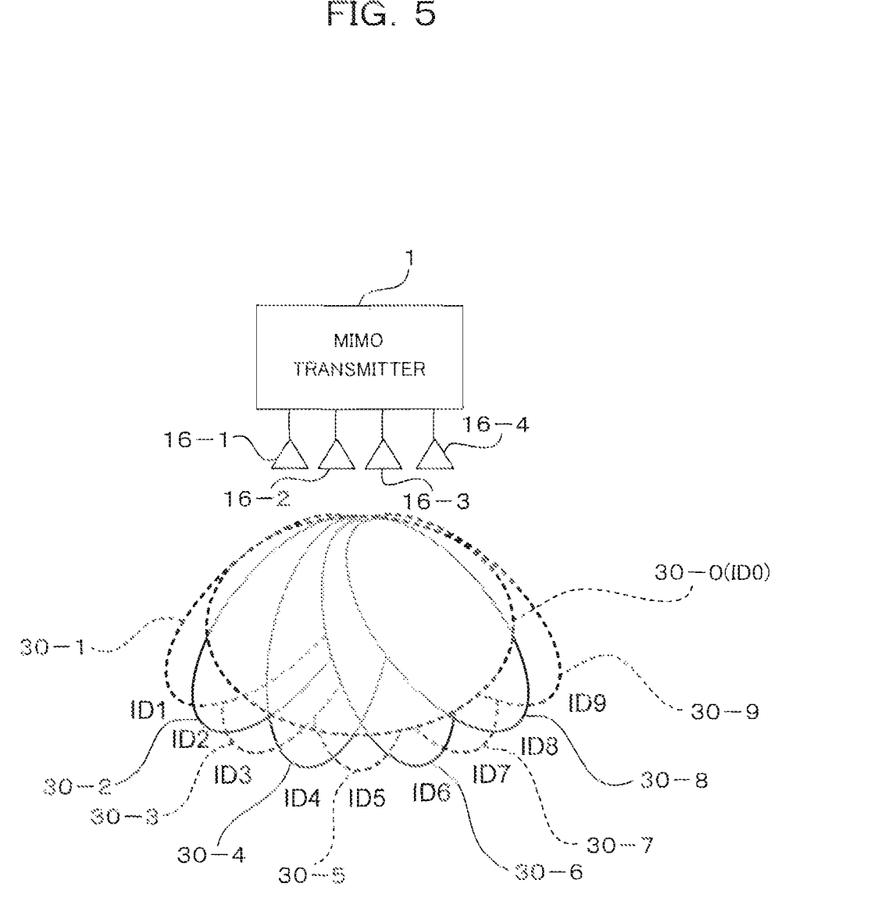
FIG. 5 is a schematic diagram illustrating one example of selectable beams for illustrating an operation of the MIMO transmission system shown in FIG. 2.

The specific example is described by using an image diagram shown in FIG. 5. FIG. 5 illustrates a case in which the transmitter 1, the number of transmitting antennas of which is n=4, may multibeam transmit with the maximum number of transmission beams is nine (beam IDs=1, 2, . . . , 9) or element transmit (ID=0) the number of transmission streams k=1 to 4.

The receiver 2 selects one beam of which reception level (reception quality) is the maximum out of entire nine beams 30-1 to 30-9 (beam IDs=1 to 9) by the above described algorithm when the number of transmission streams k=1, and selects two beams of which reception levels are high out of four beams 30-2, 30-4, 30-6, 30-8 of the even number beam IDs (IDs=2, 4, 6, 8) [or from five beams 30-1, 30-3, 30-5, 30-7, 30-9 of the odd number beam IDs (IDs=1, 3, 5, 7, 9)] as the known selectable beams when the number of transmission streams k=2. That is to say, this selects the beam under the limited condition that the interbeam correlation therebetween is low (not adjacent). Then, when the number of transmission streams increases to k=4, the receiver 2 does not select the beam under the similarly limited conditions or ultimately (in a case of the maximum number of transmission streams), this does not selects beam and receives one beam 30-0 by the element transmission (beam ID=0).

In this manner, when the number of transmission streams is small, the beam is selected from a number of beams of which beam directions are different to each other. Specifically, when the number of transmission streams k is not smaller than 2 (MIMO transmission), the beam is selected from orthogonal multibeam (or multibeam equivalent thereto) as the multibeam, when the number of transmission streams k is the maximum, the beam is not selected and one beam of the element transmission is directly received, and when the number of transmission streams k is the minimum (k=1) (SIMO transmission), the beam is selected from more beams arranged so as not to reduce gain due to the direction thereof by adding the beams faced the direction to compensate between the beams to the selectable candidate beam relative to the orthogonal beam (or the beam equivalent thereto) as the multibeam.

Then, the information of the number of transmission streams k and the beam ID determined by the receiver 2 (transmission beam ID/stream determiner 27) as described above is sent back to the transmitter 1 through the transmission system of the receiver 2 not shown as the feedback information. That is to say, in this example, the transmission beam ID/stream determiner 27 also functions as a first report section for reporting the information regarding the determined number of transmission streams and the transmission beams as the control information of the number of transmission beams formed in the transmitter 1.

On the transmitting side 1, the above-described feedback information from the receiving side 2 is reported to the beam controller 15 through a reception system of the transmitter 1 not shown, and the beam controller 15 controls the user selector 11, the channel coder/modulator 12 and the beam selector 13 based on the feedback information, and selects the number of transmission streams and the beam to perform the beam control of the transmission stream.

As described above, according to this embodiment, by controlling (changing) the number of candidate beams (the number of transmission beams to be formed) selectable on the receiving side 2 depending on the number of transmission streams on the transmitting side 1, for example, it becomes possible to obtain the gain as large as possible by the element transmission at the time of one stream and to perform the beam selection such that the interbeam correlation therebetween becomes low at the time of multistream, and the excellent throughput characteristics (reception characteristics) may be obtained while attaining both high throughput characteristics due to the low interbeam correlation and highly directional gain, without increasing the feedback information amount to the transmitter 1.

[C] Description of Second Embodiment

Figure 6:
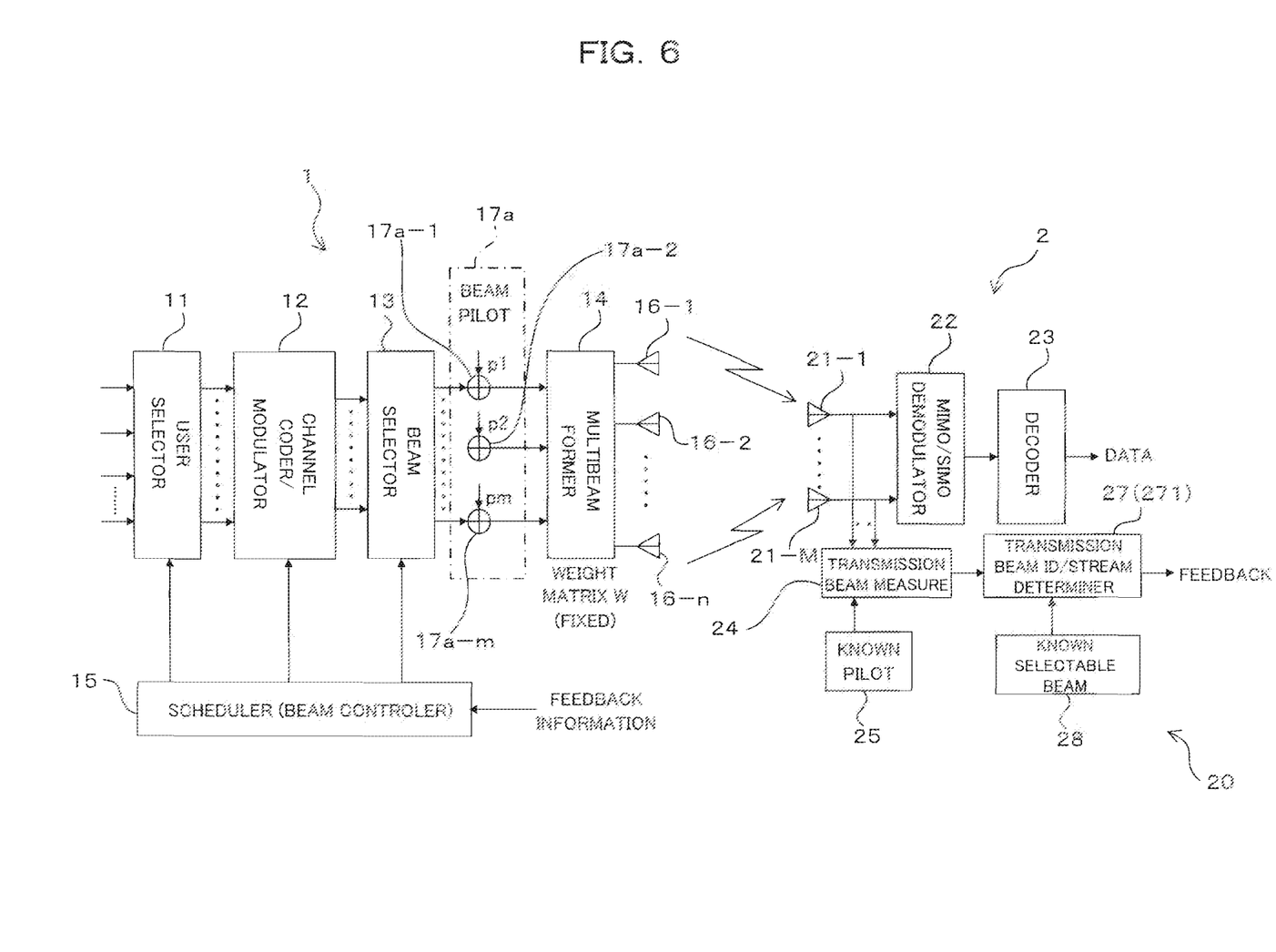
FIG. 6 is a block diagram illustrating a configuration of the MIMO transmission system according to a second embodiment.

FIG. 6 is a block diagram illustrating a configuration of the MIMO transmission system according to a second embodiment. Although the MIMO transmission system shown in FIG. 6 also is provided with the MIMO transmitter 1 and the MIMO receiver 2, this is different from the above-described configuration in FIG. 2 in that in the MIMO transmitter 1, a beam pilot multiplexer 17a is provided on a previous stage of the multibeam former 14 (subsequent stage of the beam selector 13) in place of the element pilot multiplexer 17, and in the MIMO receiver 2, the known transmission weight memory 26 is not required in the block 20, which functions as the beam selective reception control means. Meanwhile, other components designated by the same reference numerals as already described ones are same as or similar to the already described components unless otherwise noted. In addition, in this example also, the transmission weight information W= [W1, . . . , Wm] in the multibeam former 14 is fixed as in the first embodiment.

Herein, the beam pilot multiplexer (second pilot multiplex means) 17a is provided with adders (multiplex circuits) 17a-1 to 17a-m corresponding to each output depending on the number of transmission beams (maximum m) of the beam selector 13 and is for multiplexing orthogonal pilot signals p1 to pm for each beam of the multibeam by the adders 17a-1 to 17a-m.

Therefore, on the receiving side 2 (transmission beam measure 24), even if the transmission weight information W on the transmitting side 1 is not known (if the already described known transmission weight information memory 26 is not provided), the channel information of each transmission beam may be estimated based on the known pilot replica in the known pilot memory 25, so that the level measurement for each beam as in the first embodiment becomes possible. That is to say, the transmission beam measure 24 of this example functions as a second level measuring section for measuring level of the transmission beam based on the above-described pilot signal (replica).

Therefore, in this example also, in the transmission beam ID/stream determiner 27 (ranking level comparator 271), it is possible to perform the beam selection (determination of the beam ID and the number of transmission streams) depending on the number of transmission streams based on the information in the known selectable beam memory 28 (comparative beam ID table 281) as in the above-described algorithm in FIG. 4 (steps S1 to S9) and feed back the information to the transmitting side 1.

That is to say, the transmission beam ID/stream determiner 27 of this example functions as a second determining section for determining the number of transmission streams and the transmission beams to be received based on the level measuring result by the transmission beam measure 24 as the above-described second level measuring section, and also functions as a second report section for reporting the information regarding the number of transmission streams and the transmission beams, which are determined, as the control information of the number of transmission beams in the transmitter 1.

Then, in this case, the beam controller 15 of the transmitter 1 also functions as second reported information receiving means for receiving the information regarding the number of transmission streams and the transmission beam, determined based on the level measurement result measured for the transmission beam based on the pilot signal as described above in the receiver 2 and is reported from the receiver 2, and performs the control of the number of transmission beams based on the received information.

Therefore, the effect and advantage similar with those of the first embodiment may be obtained, and in this example, the known transmission weight memory 26 is not required on the receiving side 2, so that it is possible to simplify the configuration and process on the receiving side 2.

[D] Description of Third Embodiment

Figure 7:
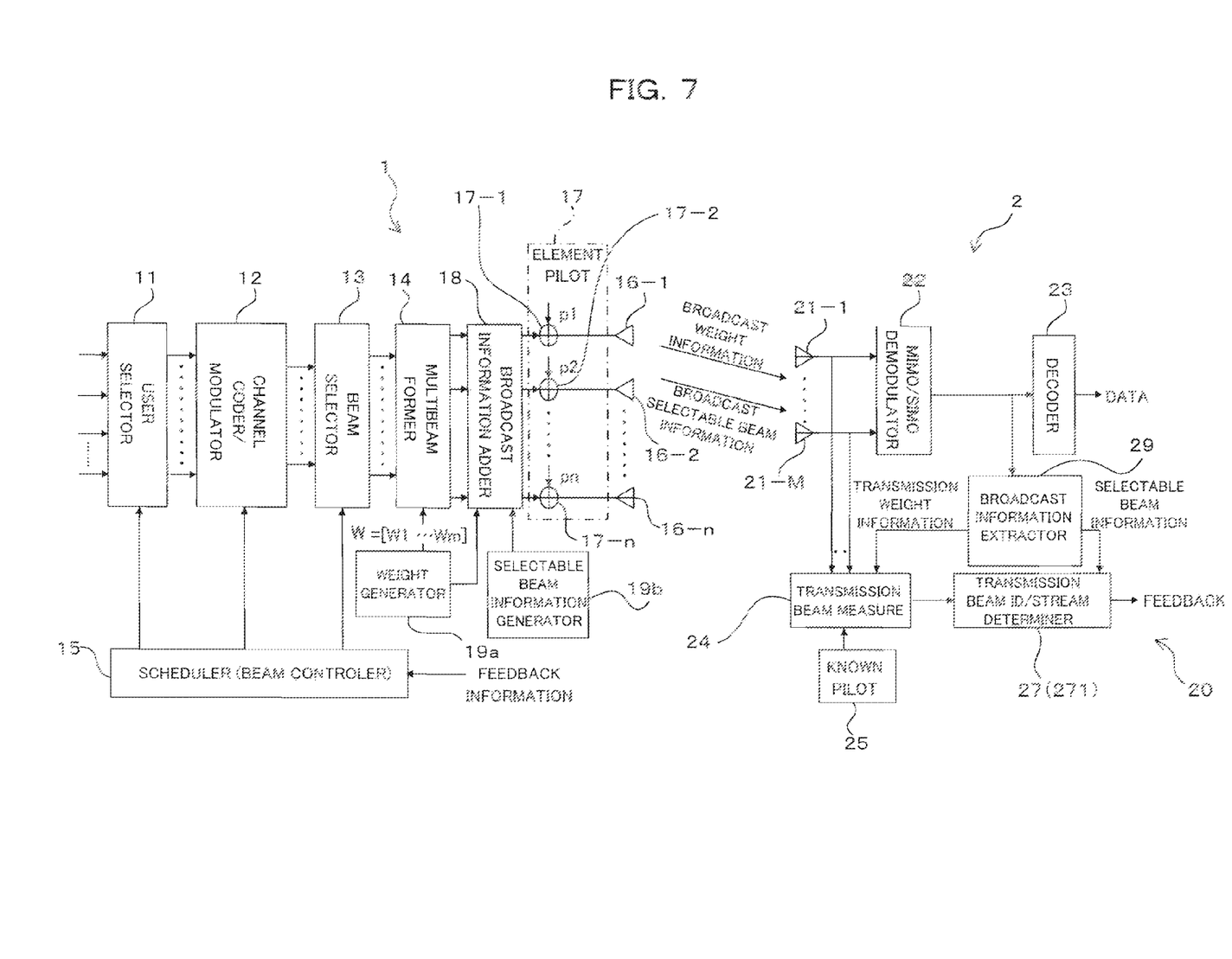
FIG. 7 is a block diagram illustrating a configuration of the MIMO transmission system according to a third embodiment.

FIG. 7 is a block diagram illustrating a configuration of the MIMO transmission system according to a third embodiment, and although the MIMO transmission system shown in FIG. 7 also is provided with the MIMO transmitter 1 and the MIMO receiver 2, this is different from the configuration described above in FIG. 2 in that in the MIMO transmitter 1, a broadcast information adder 18 is provided on a subsequent stage of the multibeam former 14 and a weight generator 19a and a selectable beam information generator 19b are provided, and in the MIMO receiver 2, in the block 20, which functions as the beam selective reception control means, a broadcast information extractor 29 is provided and the known transmission weight memory 26 and the known selectable beam memory 28 (comparative beam ID table 281) are not required. Meanwhile, other components indicated by the same reference numerals as the already described ones are the same as or similar to the already described components unless otherwise noted.

Here, in the transmitter 1, the weight generator 19a adaptively generates the transmission weight information W=[W1, ... , Wm] used in the multibeam former 14. That is to say, the beam former 14 of this example functions as a second beam former for performing the beam transmission by the variable transmission weight information W.

The selectable beam information generator 19b generates the information regarding the beam selectable on the receiving side 2 (limiting condition of beam selection), for example, information corresponding to the contents of the comparative beam ID table 281 described above in FIG. 3.

That is to say, in this example, it is possible to change (control) the transmission weight information W, and the information regarding the beam selectable by the transmission weight information W and the number of transmission streams (hereinafter, referred to as selectable beam information).

The broadcast information adder (broadcasting means) 18 is required to report the variable information to the receiving side 2, so that this is for adding (multiplexing) to the transmission stream as the information such as a (downlink) inform channel to the receiving side 2. Meanwhile, an updating period of the broadcast information, that is to say, the updating period of the transmission weight information W by the weight generator 19a and the updating period of the selectable beam information by the selectable beam information generator 19b are set depending on the system.

On the other hand, in the receiver 2, the broadcast information extractor section 29 is for extracting the broadcast information (transmission weight information W and the selectable beam information) from the signal demodulated by the MIMO/SIMO demodulator 22, and the transmission weight information W and the selectable beam information out of the extracted broadcast information are configured to be sent to the transmission beam measuring section 24 and the transmission beam ID/stream determiner 27, respectively.

Therefore, in the transmission beam measure 24 of this example, the channel estimation of each beam becomes possible based on the transmission weight information W broadcasted from the transmitter 1 and extracted by the broadcast information extractor 29 and the pilot replica in the known pilot memory 25, and the level measurement for each beam as in the first embodiment becomes possible without requiring the already described known transmission weight memory 26. That is to say, the transmission beam measure 24 of this example functions as a third level measuring section for performing the level measurement of the transmission beam based on the pilot signal and the transmission weight information W broadcasted from the transmitter 1.

Also, the transmission beam ID/stream determiner 27 may perform the beam selection (determination of the beam ID and the number of transmission streams) depending on the number of transmission streams as in the above-described algorithm in FIG. 4 (steps S1 to S9) based on the selectable beam information extracted by the broadcast information extractor 29, the level measurement result by the transmission beam measure 24 and the threshold (TH[k]) depending on the above-described number of transmission streams, and feed back the information to the transmitting side 1. This means that in the receiver 2, the information corresponding to the above-described comparative beam ID table 281 may be built or updated based on the information extracted by the broadcast information extractor 29.

That is to say, the transmission beam ID/stream determiner 27 of this example functions as a third determining section operable to determine the number of transmission streams and the transmission beam to be received based on the level measurement result by the transmission beam measure 24 as the third level measuring section and the selectable beam information broadcasted from the transmitter 1 (information regarding the number of transmission beams), and also functions as a third report section to report the information regarding the number of transmission streams and the transmission beam, which are determined, as the control information of the number of transmission beams in the transmitter 1.

Then, in the transmitter 1, the above-described control information (feedback information) reported from the receiver 2 is received at the beam controller 15, and based on the information, the transmission beam control is performed. That is to say, the beam controller 15 of this example also functions as third reported information receiving means to receive the information regarding the number of transmission streams and the transmission beam, determined based on the level measurement result measured for the transmission beam based on the pilot signal and the transmission weight information W broadcasted by the broadcast information adder 18 and the selectable beam information broadcasted by the broadcast information adder 18, and is reported from the receiver 2, and controls the number of transmission beams based on the received information, in the receiver 2, as described above.

Therefore, the effect and advantage same as or similar to those in the first embodiment may be obtained, and in this example, by adaptively changing the transmission weight information W and the selectable beam information depending on a communication environment between the transmitter 1 and the receiver 2, it is possible to achieve the optimal beam selection depending on the communication environment, thereby further improving the throughput characteristics.

Meanwhile, although both of the transmission weight information W and the selectable beam information are made variable and each information is broadcasted to the receiving side 2 in the above-described embodiment, it is possible that only one of them is made variable and is broadcasted to the receiving side 2.

In addition, it is possible to multiplex the orthogonal pilot signal for each beam in this example also, as in the second embodiment. In this case, as described above, it is not required to know the transmission weight information W on the receiving side 2, it is only necessary to broadcast only the selectable beam information to the receiving side 2.

Meanwhile, it goes without saying that the present invention is not limited to the above-described embodiments and various changes may be made without departing from the scope of the invention.

INDUSTRIAL APPLICABILITY

As described above in detail, according to the embodiments, by changing the number of transmission beams (the original number of beams selectable on the receiving side) to be formed depending on the number of transmission streams, it is possible to achieve the system performing the excellent communication, that is to say, the high throughput characteristics by low interbeam correlation at the time of the multi-stream transmission and the large directional gain at the time of the single stream, by the small feedback information only for the beam selection, so that this is considered to be extremely useful in the field of wireless communication technique.

What is claimed is:

1. A wireless transmission method capable of transmitting a data stream by a wireless transmitter having a plurality of transmitting antennas, the wireless transmission method comprising:
   at the wireless transmitter,
      changing a number of candidate transmission beams to be formed at the wireless transmitter for transmitting the data stream according to a number of transmission data streams to be transmitted at the wireless transmitter, said candidate transmission beams, from which at least one transmission beam is selected to be used for receiving the data stream, being formed by predetermined number of the plurality of transmitting antennas.

2. The wireless transmission method according to claim 1, further comprising:
   at a wireless receiver,
      selecting the at least one transmission beam to be used for receiving the data stream, a number of the at least one transmission beam being equal to the number of the transmission data streams.

3. The wireless transmission method according to claim 1, wherein at said wireless transmitter, changing said number of candidate transmission beams so that said number of candidate transmission beams increases as said number of the transmission data streams becomes smaller.

4. A wireless transmitter capable of transmitting a data stream to a wireless receiver, the wireless transmitter comprising:
   a plurality of transmitting antennas; and
   a controller configured to change a number of candidate transmission beams to be formed at the wireless transmitter for transmitting the data stream according to a number of transmission data streams to be transmitted at the wireless transmitter, said candidate transmission beams, from which at least one transmission beam is selected to be used for receiving the data stream, being formed by predetermined number of the plurality of transmitting antennas.

5. The wireless transmitter according to claim 4, wherein said controller configured to change said number of candidate transmission beams so that said number of candidate transmission beams increases as said number of the transmission data streams becomes smaller.

6. The wireless transmitter of claim 4, wherein the wireless transmitter is a base station.

7. A wireless system comprising:
   a wireless receiver; and
   a wireless transmitter capable of transmitting a data stream to the wireless receiver, wherein
   the wireless transmitter comprises:
      a plurality of transmitting antennas; and
      a controller configured to change a number of candidate transmission beams to be formed at the wireless transmitter for transmitting the data stream according to a number of transmission data streams to be transmitted at the wireless transmitter, said candidate transmission beams, from which at least one transmission beam is selected to be used for receiving the data stream, being formed by predetermined number of the plurality of transmitting antennas.

8. The wireless system of claim 7, wherein
   the wireless transmitter is a base station, and
   the wireless receiver is configured to select the at least one transmission beam to be used for receiving the data stream, a number of the at least one transmission beam being equal to the number of the transmission data streams.

* * * * *